United States Patent
Huffner et al.

(10) Patent No.: US 12,231,390 B2
(45) Date of Patent: *Feb. 18, 2025

(54) DOMAIN NAME CLASSIFICATION SYSTEMS AND METHODS

(71) Applicant: Proofpoint, Inc., Sunnyvale, CA (US)

(72) Inventors: Sharon Huffner, Munich (DE); Ali Mesdaq, San Jose, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,564

(22) Filed: Sep. 29, 2023

(65) Prior Publication Data
US 2024/0039886 A1    Feb. 1, 2024

Related U.S. Application Data

(63) Continuation of application No. 17/500,915, filed on Oct. 13, 2021, now Pat. No. 11,799,823, which is a continuation of application No. 16/866,297, filed on May 4, 2020, now Pat. No. 11,171,916, which is a continuation of application No. 15/687,660, filed on Aug. 28, 2017, now Pat. No. 10,673,814.

(51) Int. Cl.
*H04L 61/30* (2022.01)
*H04L 9/40* (2022.01)
*H04L 61/4511* (2022.01)

(52) U.S. Cl.
CPC ...... *H04L 61/3005* (2013.01); *H04L 61/4511* (2022.05); *H04L 63/1483* (2013.01)

(58) Field of Classification Search
CPC ............. H04L 61/3005; H04L 61/4511; H04L 63/1483; H04L 61/302; H04L 61/3025
See application file for complete search history.

(56) References Cited

U.S. PATENT DOCUMENTS 10,764,246 B2 *  9/2020  Huang ................ H04L 61/3025

* cited by examiner

*Primary Examiner* — Kristie D Shingles
(74) *Attorney, Agent, or Firm* — Sprinkle IP Law Group

(57) ABSTRACT

Disclosed is a domain engineering analysis solution that determines relevance of a domain name to a brand name in which a domain name, brand name, and identification of a substring of the domain name may be provided to or obtained by a computer embodying a domain engineering analyzer. A list of features may be determined. The list of features may include a lexicon, or a set of key-value pairs that encode information about terms included as substrings in the domain name. Determining the features may include obtaining a language model for each term, analyzing a cluster of language models closest to the obtained language model, and determining and scoring a relevance of each term to the brand name. The determined relevance and score of each term may be provided to a client. This relevance analysis can be dynamically applied in an online process or proactively applied in an offline process.

20 Claims, 6 Drawing Sheets

```
[
  {
    "url": "1HRBC.INFO",
    "is_homoglyph": 0,
    "is_vowel_swap": 0,
    "is_transposition": 0,
    "is_confusable": 0,
    "levenshtein_distance": 2,
    "is_seed_string_present": 0,
    "seed": "hsbc.info",
    "is_repetition": 0,
    "match_root": "hrbc",
    "is_qwerty_typo": 0,
    "is_bitsquatting": 1,
    "is_hyphenation": 0,
    "match_length": 4,
    "levenshtein_distance_1": 0,
    "levenshtein_distance_2": 0,
    "match_offset": 1
  },
  {
    "url": "24HLOCKSMITHSBCN.INFO",
    "is_homoglyph": 0,
    "is_vowel_swap": 0,
    "is_transposition": 0,
    "is_confusable": 0,
    "levenshtein_distance": 12,
    "is_seed_string_present": 1,
    "seed": "hsbc.info",
    "is_repetition": 0,
    "match_root": "hsbc",
    "is_qwerty_typo": 0,
    "is_bitsquatting": 0,
    "is_hyphenation": 0,
    "match_length": 4,
    "levenshtein_distance_1": 0,
    "levenshtein_distance_2": 0,
    "match_offset": 11
  },
  {
    "url": "24HOURLOCKSMITHSBARCELONA.INFO",
    "is_homoglyph": 0,
    "is_vowel_swap": 0,
    "is_transposition": 0,
    "is_confusable": 0,
    "levenshtein_distance": 21,
```

With callouts: 400 (overall), 402/412 (url), 404/414 (seed), 405/415 (is_seed_string_present), 406/416 (match_root), 408/418 (match_offset), 410/420 (match_length).

FIG. 4

DOMAIN NAME CLASSIFICATION SYSTEMS AND METHODS

CROSS REFERENCE TO RELATED APPLICATIONS

This application is a continuation of, and claims a benefit of priority under USC § 120 from, U.S. patent application Ser. No. 17/500,915, filed Oct. 13, 2021, issued as U.S. Pat. No. 11,799,823, entitled "DOMAIN NAME CLASSIFICATION SYSTEMS AND METHODS," which is a continuation of, and claims a benefit of priority under USC § 120 from, U.S. patent application Ser. No. 16/866,297, filed May 4, 2020, issued as U.S. Pat. No. 11,171,916, entitled "DOMAIN NAME CLASSIFICATION SYSTEMS AND METHODS," which is a continuation of, and claims a benefit of priority under USC § 120 from, U.S. patent application Ser. No. 15/687,660, filed Aug. 28, 2017, issued as U.S. Pat. No. 10,673,814, entitled "DOMAIN NAME CLASSIFICATION SYSTEMS AND METHODS," all of which are fully incorporated by reference herein for all purposes.

TECHNICAL FIELD

This disclosure relates generally to domain name classification and detection of spoofed brand domains in distributed network computing environments. More particularly, this disclosure relates to systems and methods for classifying domain names using language models. More particularly, this disclosure relates to systems and methods for classifying domain names using language models. More particularly, this disclosure relates to systems and methods for determining whether particular domain names are relevant to a brand, or not relevant to the brand, using language models.

BACKGROUND OF THE RELATED ART

A "domain name" generally may include an identification string that defines a realm of administrative autonomy, authority or control within the Internet. Domain names, which may also be referred to as "domains" herein, may be formed by the rules and procedures of the Domain Name System (DNS). Domain names are used in various networking contexts and application-specific naming and addressing purposes. In general, a domain name represents an Internet Protocol (IP) resource, such as a computer used to access the Internet, a server computer hosting a web site, or the web site itself or any other service communicated via the Internet.

Domain names are organized in subordinate levels (subdomains) of the DNS root domain, which is nameless. The first-level set of domain names are the top-level domains (TLDs), including the generic top-level domains (gTLDs), such as the prominent domains com, info, net, edu, and org, and the country code top-level domains (ccTLDs). Below these top-level domains in the DNS hierarchy are the second-level and third-level domain names that may be open for reservation by end-users who wish to connect local area networks to the Internet, create other publicly accessible Internet resources or run web sites.

Domain names may serve to identify Internet resources, such as computers, networks, and services, with a text-based label that is easier to memorize than the numerical addresses used in the Internet protocols. For example, a domain name may represent entire collections of such resources or individual instances. Individual Internet host computers may use domain names as host identifiers, also called host names. The term host name may also be used for the leaf labels in the domain name system, usually without further subordinate domain name space. For example, host names may appear as a component in Uniform Resource Locators (URLs) for Internet resources such as web sites.

Domain names may also be used as simple identification labels to indicate ownership or control of a resource. Such examples are the realm identifiers used in the Session Initiation Protocol (SIP), the Domain Keys used to verify DNS domains in e-mail systems, and in many other Uniform Resource Identifiers (URIs).

An example function of domain names is to provide easily recognizable and memorizable names to numerically addressed Internet resources. This abstraction may allow any resource to be moved to a different physical location in the address topology of the network, globally or locally in an intranet. Such a move may involve changing the IP address of a resource and the corresponding translation of this IP address to and from its domain name.

Additionally, domain names may be used to establish a unique identity. For example, organizations may choose a domain name that corresponds to their name (or brand), helping Internet users to reach them easily. In this context, a brand is a name, term, design, symbol, or other feature that distinguishes an entity (e.g., organization, product, etc.) from its rivals or competitors in the eyes of others (e.g., consumers).

In order to confuse potential victims, attackers of computer systems may try to register domain names that are similar to a certain brand (e.g., Apple®, Microsoft®, etc.) in order to confuse potential victims. Those domain names may often contain the name of the brand or a word similar to the brand name. Another tactic that may be used by attackers is including one or more auxiliary terms in the domain that are connected to the brand but not derived from the brand name. For example, a spoofed domain for a bank may also include the words "financial" or "investment." As another example, a spoofed domain for a brand may include other trademarks of the brand, such as iPod® of Apple Inc.

Today's Internet technologies, including domain name registration processes, DNS servers, and browser applications, do not provide Internet users or brand name owners with sufficient protection from potential spoofing or phishing on the Internet. Consequently, there is room for technical innovations and improvements.

SUMMARY OF THE DISCLOSURE

Embodiments disclosed herein can address the aforementioned drawbacks and provide additional technical solutions and benefits. One example aspect of the invention is to provide classifications of domain names.

Embodiments disclosed herein provide a new system, method, and computer program product for classifying domain names by categorizing substrings of the domain names. For example, a domain name may be determined as being relevant to a brand name, or as not relevant to the brand name. For example, the relevance may be determined as a relevancy measurement, with regard to the brand name.

In some embodiments, a domain name, a seed value, and an identification of a substring of the domain name may be obtained by a computer embodying a domain engineering analyzer disclosed herein. The substring is an exact match, or an approximate match to the seed value. The seed value may include the brand name. A set of features may be determined, the set of features including processed key-value pairs that encode information about terms included as substrings in the domain name. The determining may include obtaining a language model for each term, analyzing a cluster of language models closest to the obtained language model, and determining and scoring a relevance of each term to the seed value, based on the analyzing. The determined relevance and relevance score may be provided to a client of the domain engineering analyzer.

In some embodiments, a request for analysis of relevance of a domain name to a brand name may be obtained. In response to the request, a list of features may be determined. The features may include information associated with one or more terms included as substrings in the domain name. The determining may include obtaining a language model for each term, analyzing a cluster of language models closest to the obtained language model, determining a relevance measurement value, and determining a score of the determined relevance measurement value of each respective term to the brand name, based on the analyzing. The determined relevance measurement value and the score of the determined relevance measurement value of each respective term may be provided to a client.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

Embodiments disclosed herein can provide many technical advantages. For example, current users of networks such as the Internet do not have viable detection techniques for detecting phishing and/or domain name spoofing activities of potential cyber attackers. Embodiments disclosed herein can fill this void in an effective and proactive manner, providing users and brand/domain owners a technical solution to preemptively identify domains that may be relevant, or not relevant, to particular brand names.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 4 illustrates an example file containing word-value pairs that have been pre-processed according to some embodiments disclosed herein.

DETAILED DESCRIPTION

Figure 1:
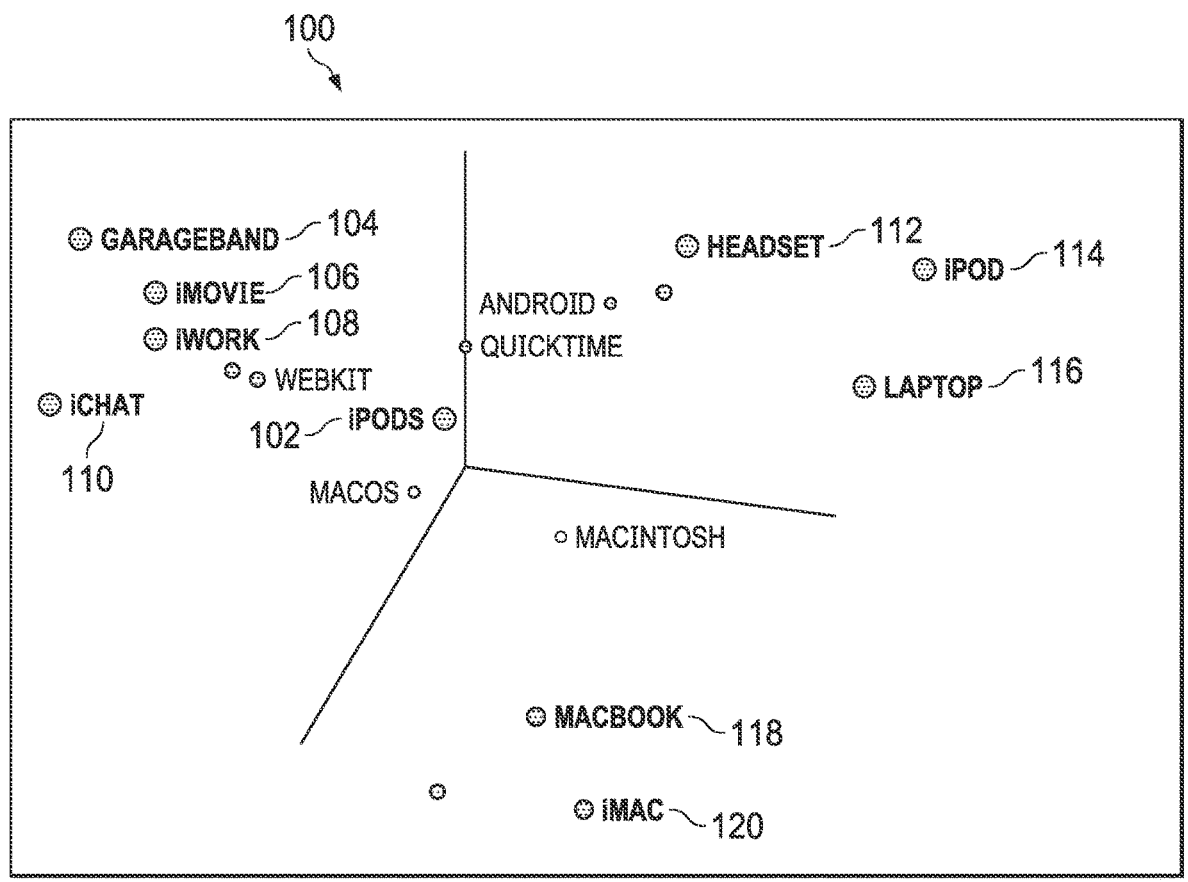
FIG. 1 depicts an example digital computerized visualization of a three-dimensional (3D) projection of word vectors close to a word.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The DNS translates a domain name, which consists of a human-readable identification string of ASCII characters, to a corresponding numerical Internet Protocol (IP) address where a desired network resource such as a home page of a web site is located (usually on a web server). The web server sends the information to the web browser that is requesting the home page. The web browser may render the home page and display it on a computer on which the web browser runs.

Today's web browsers do not implement very advanced techniques to detect improperly named or "spoofed" domains. A web browser typically does not detect whether a domain name may appear to be similar to, but may be totally irrelevant to, another domain name. Rather, any time a domain is determined (manually by a programmer or programmatically by a machine) to be malicious, it may be added to their blacklist. It does not matter whether it is a domain name that is actually relevant to a brand name or not.

Domain names can be attacked in many ways. For example, in a type of domain name attack referred to as typosquatting, a domain name that looks similar to a more established domain name may be used to deceive or fool a user. A typosquatting domain name may be a variant of the more established domain name. For example, a slight change such as a capital case of "I" or "1" may be used instead of a lower case "l"; a hyphen may be added; a small typo may be introduced; an extra character may be omitted or added; or the number "0" may be used instead of a lower case "o"—the variations can be limitless.

As discussed above, attackers of computer systems may try to register domain names that are similar to those operated by a brand (e.g., Apple®, Microsoft®, etc.), in order to confuse potential victims.

Attackers may employ these tactics for several reasons. For example, the similar domain names may provide more credibility to spoofed domains in the eyes of potential victims. Further, spoofed domain names that contain the brand name exactly (e.g., as a substring within the spoofed domain name) may be less difficult for monitoring services to find and shut down. By creating domain names with related terms (i.e., terms that may be related to the brand name), attackers may include only an approximate match to the brand name and manage to evade detection, while the approximate match may still appear to be familiar to potential victims.

As a related problem in detecting potential spoofed domains, when relying on exact and approximate match to a brand name in order to detect the potential spoofed domains, legitimate domains that are unrelated to the brand but whose name still include a match to the brand name may be encountered. For example, a brand name such as ING™ may be short. Any domain name that includes a present participle (e.g., "going", "laughing", "eating") would also include an exact match for "ing".

To add credibility, for example, potential attackers may include auxiliary terms in the domain name that are associated with the brand, but not derived from the brand name. This may be referred to herein as domain name engineering or domain name "social engineering." For example, a spoofed domain name for a bank might also include the words "financial" or "investment". As another example, a spoofed domain name for a brand could include other trademarks of the brand, such as iPod® of Apple Inc.

As examples, "apple-account-login.com" may be detected as having "Apple" as a substring, "chase-investment-center.com" may be detected as having "Chase" as a substring, and "icloudupdate.com" may be detected as having "iCloud" as a substring.

As another related problem, when detecting potential spoofed domains by looking for those that contain, as a substring, the brand name, legitimate domains may be encountered that are unrelated to the brand but whose name still includes the brand name as a substring. For example, the brand name may be ambiguous, having more than one definition. For example, Apple is a fruit as well as a brand name, and any domain name referring to the fruit, such as "appleorchard.com", would also include an exact match for the brand name Apple®.

As examples, "purchaseparty.com" may not be detected, although it has "Chase" as a substring, "applefarms.com" may not be detected, although it has "Apple" as a substring, and "worldbankmarijuana.com" may not be detected, although it has "WorldBank" as a substring.

Suppose "Company.com" is an established domain for a famous "Company" and "my.company.com" is a spoofing/phishing site. A web browser will not know that the second domain may be completely irrelevant to the first domain name. There is no intelligence in the web browser's function—it will respond to a user selecting a link, resolve that link to a network resource IP address, render the network resource (e.g., a web page), and display the rendered document. If the web browser determines that "my.company.com" is a phishing site, for example, by referencing its blacklist (into which the site must have been previously added), then the browser may inform the user that the site does not seem to be legitimate. By this time, the web browser may already begin loading the page from the phishing web site "my.company.com" and/or the potentially malicious software may have already been downloaded onto the user's computer.

Embodiments disclosed herein provide a technical solution that is independent of browser functions. In some embodiments, domain name engineering analyses may be performed in an offline process or an online process in real time to ascertain whether there is any registered domain name that is similar to brand names (which, in some embodiments, are referred to as "seeds"). In an offline process, no browser function and no user interaction may be needed.

Example techniques discussed herein may provide at least a portion of a pipeline for identifying domains where domain name engineering (e.g., domain name social engineering) has been used. In some example embodiments, an input may include a domain name and a brand name, and an output may include a list of features: (key, value) pairs that encode information about the terms found in the input domain name and their relevance to the brand, as well as lexical information about the character distribution. In some example embodiments, the input may include indices of an exact or approximate match for the brand name, in the input domain name. For example, such indices may indicate a starting location and an ending location of a substring within the input domain name. For example, if an input domain name is "mynameisjohndo.com" then indices for the substring "name" may be indicated as 3 and 6, for starting and ending locations of the substring, within the input domain. One skilled in the art of computing will understand that there may be many other techniques for indicating positions of substrings within the input domain (e.g., the indices may be indicated a 2 and 5, if assuming that "my" begins at index 0, or the indices may be indicated as an offset location within the input domain, and a length of the substring, etc.).

In this context, a "pipeline" refers to a process, or a sequence of steps, such that, after an initial step, other steps in the pipeline, each considered as a current step, use output from a previous step as input to the current step.

For example, the information about the terms and their relevance may be determined based on lexicons that cover various topics and verticals (e.g., financial terms, insurance-related terms, engineering-related terms, geographical locations, phishing terms), and word embeddings (e.g., word vectors). By analyzing the cluster of word vectors closest to the word vector for the term under consideration, the term's relevance to the brand name may be determined and scored.

In this context, word vectors may be considered a form of language modeling. In the context of the discussion herein, "language models" include "word vectors" and "word embeddings". In this context, a "word vector" may include an embedding of a word in space (e.g., multidimensional space). By using word vectors, it is possible to analyze angles between them, and distances between them, using various distance metrics. For example, cosine and Euclidean distance measures may be used, although one skilled in the art will understand that many other metrics may also be used.

For example, it may be possible to graph 20 words that are closest to the term "ipod".

FIG. 1 depicts an example digital computerized visualization 100 of a three-dimensional (3D) projection of word vectors for words that are relevant to "ipod". As shown in bold print in FIG. 1, "ipods" 102, "garageband" 104, "imovie" 106, "iwork" 108, "ichat" 110, "headset" 112, "ipod" 114, "laptop" 116, "macbook" 118, and "imac" 120 represent example word vectors of words that are relevant to "ipod" in the example 3D projection.

With the information discussed above, example techniques discussed herein may automatically and accurately determine whether a term is related to a brand, as well as whether it is not at all related to the brand.

Input information for the domain social engineering processing includes pre-processed information, as discussed below.

Figure 2:
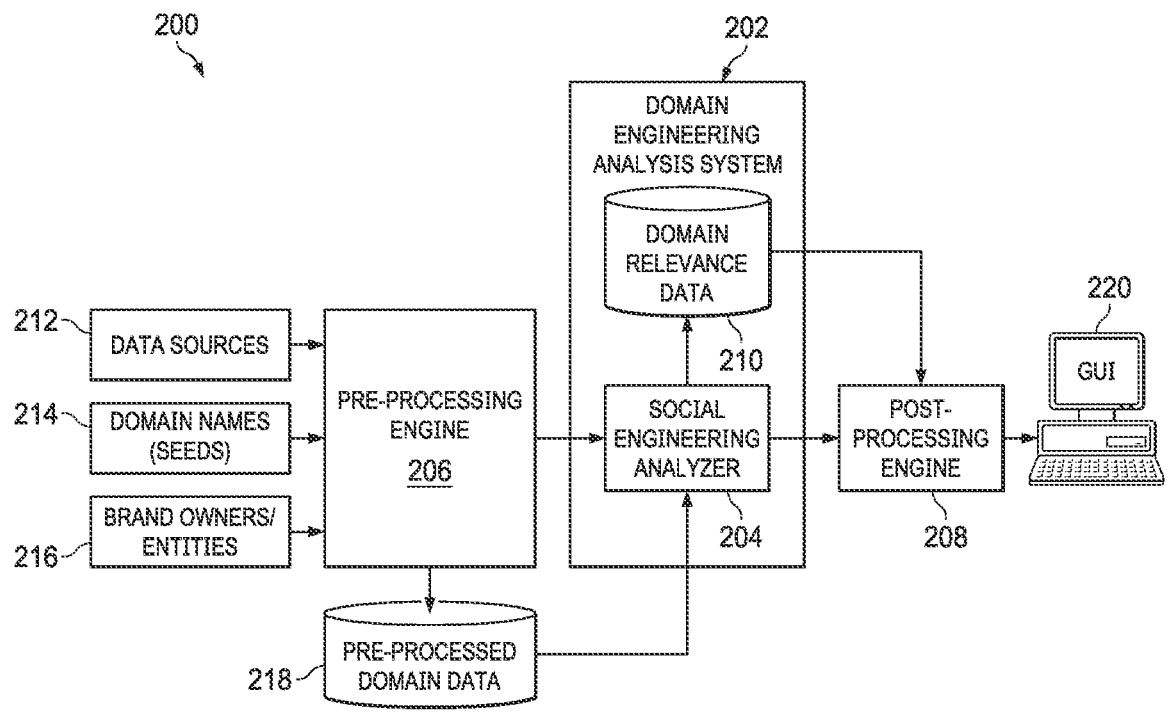
FIG. 2 depicts a flow diagram showing input and output examples of a domain engineering analyzer according to some embodiments disclosed herein.

FIG. 2 depicts a flow diagram showing input and output examples of a domain engineering analysis system according to some embodiments disclosed herein.

In the example of FIG. 2, a domain engineering analysis system 202 may include a social engineering analyzer 204. A pre-processing engine 206 may provide pre-processed information to domain engineering analysis system 202, and domain engineering analysis system 202 may provide output processed information to a post-processing engine 208. In some embodiments, pre-processing engine 206 may obtain input from data sources 212, as discussed further below. Domain names (seeds) 214 may also be provided to pre-processing engine 206. Alternatively, or additionally, brand owners/entities 216 may provide a list of their domain name(s) or seed(s).

As illustrated in FIG. 2, pre-processing engine 206 may store all or a portion of its pre-processed domain data 218 in persistent storage. As shown in the example of FIG. 2, the pre-processed information may be obtained by social engineering analyzer 204, which determines whether an input domain name contains terms, as substrings, that are relevant to a brand name, using language models, as discussed further below. Social engineering analyzer 204 may persistently store its processed domain relevance data 210, and the output of social engineering analyzer 204 may be provided to post-processing engine 208 (e.g., as a client of domain engineering analysis system 202). In turn, post-processing engine 208 may perform further processing, and provide results to an end user 220 (e.g., via a GUI on a display device).

Figure 3:
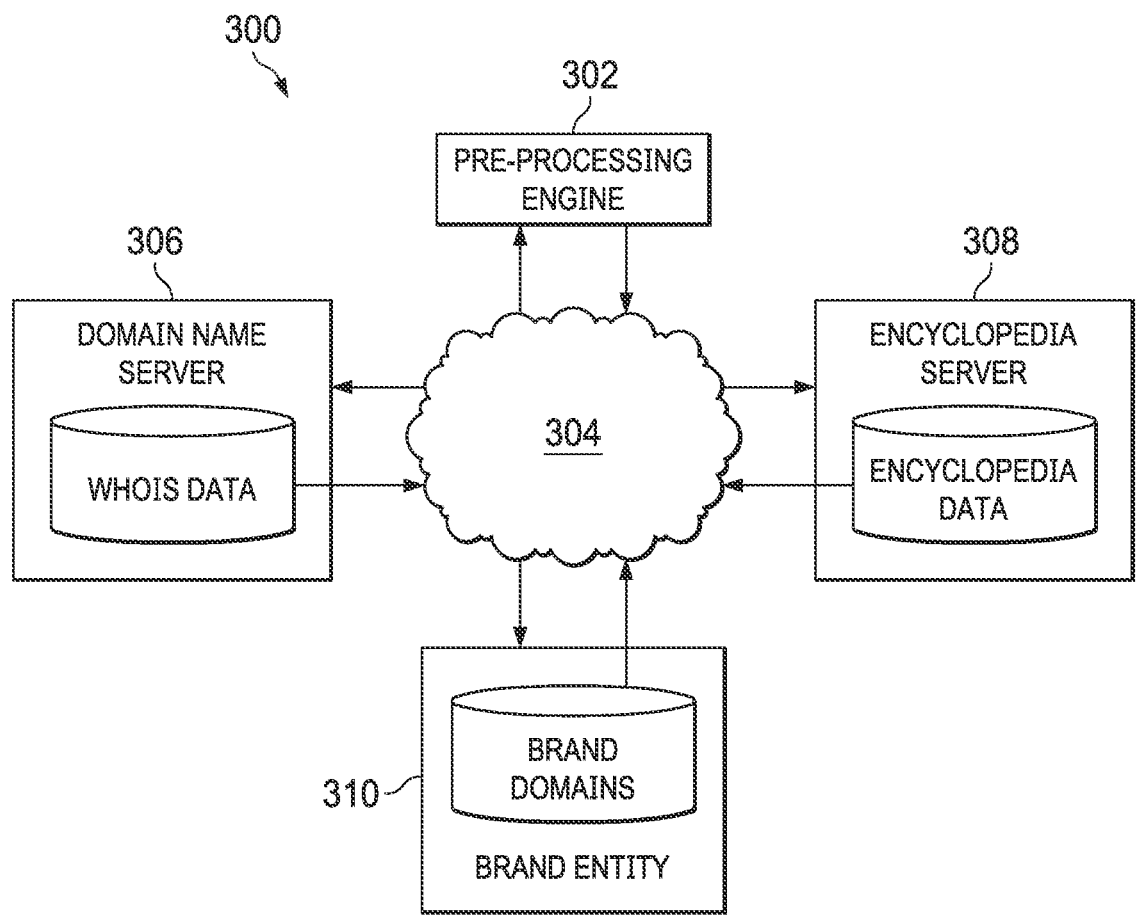
FIG. 3 illustrates some example data sources to a pre-processing engine according to some embodiments disclosed herein.

FIG. 3 further illustrates some example data sources to the pre-processing engine. As shown in FIG. 3, a pre-processing engine 302 may interact with multiple data sources over a network 304 (e.g., the Internet, a private LAN, etc.) to obtain input data. For example, a brand entity 310 may provide information regarding its brand domains (e.g., domains owned/controlled by the brand, or brand entity). As another non-limiting example, a domain name server 306 may provide information regarding all registered domain names (e.g., using WHOIS data). This information may be provided by request of pre-processing engine 302, scheduled for periodic download, or on demand. As another non-limiting example, input data may be obtained from an encyclopedia server 308 (e.g., an encyclopedia server named "Wikipedia" that is hosted by the Wikimedia Foundation, etc.).

In some embodiments, lexicons may be generated by pre-processing engine 302 by collecting lists and extracting terms from external sources (e.g., Wikipedia entries). For example, the lexicons may be generated manually or automatically. In some embodiments, a Phishing lexicon may be generated by collecting common terms used in Phishing URLs. In this context, "lexicon" refers to a vocabulary or a vocabulary list (e.g., a dictionary). In this context, "phishing" refers to masquerading as a trustworthy entity in an electronic communication.

In some embodiments, for every brand name, a set of words may be collected by pre-processing engine 302, and their relevance may be determined, for example, using word vectors, or language models.

In some embodiments, an input to this process may include a list of domains that have been registered by the brand. For example, the list of domains may be provided by the owner of the brand name, for use as input to the process. Terms considered important to the brand may be determined by analyzing the terms used in those domains. For example, for each brand, all words that appear in the brand may be extracted. The extracted words may be determined as "interesting" to the brand. The extracted words may be analyzed, for example, by analyzing their environment, word vectors, etc. to generate a list of "true positives" (also referred to as TPS herein).

Further, a list of all registered domain names that contain an exact match to the brand name (e.g., the seed), as a substring of the brand name, may be determined by searching WHOIS data (e.g., by obtaining a list of all existing registered domain names, and details associated with each registered domain name). For example, for a seed such as "apple", the list of all existing registered domain names may be searched to determine all existing domain names that have "apple" as a substring within them.

All terms contained in any domain name may be extracted from the two lists discussed above. For example, the extraction may be performed using segmentation (e.g., using an Apache2-licensed word segment Python module). In this context, "segmentation" refers to partitioning text strings into separated blocks of text. For example, the text string "applecorestoday" may be segmented into parts: "apple-cores-today". For this example, dashes ("-") are used to separate the segmented parts. One skilled in the art of computing will understand that other segments may also be determined, and other segmenting techniques may be used.

As another non-limiting example, the extraction may be performed by determining all n-grams, or every possible substring of each text string. One skilled in the art of computing will understand that other extraction techniques may be used.

Based on the extracted terms, words that are included in the domains may be analyzed. For example, the terms "fruit", "juice", "orchard" may be extracted from domains containing the substring "apple".

In some embodiments, the extracted terms may be analyzed to determine whether they exist as substrings in domains actually owned by the brand (e.g., Apple®). If it is determined that they do not exist as substrings in domains actually owned by the brand, then the analysis may determine that the extracted terms, or words, are not actually related to the brand (or entity that owns/sponsors the brand), and the extracted terms may be indicated as "false positives" (also referred to as FPS herein).

In some embodiments, for the extracted terms, a score summarizing relevance to the brand may be computed. For each of the extracted terms, its word vector may be retrieved. For example, pre-trained word vectors that come with spaCy may be retrieved. Other conventional non-limiting example sources of pre-trained word vectors include GloVe (Global Vectors for Word Representation), currently licensed by Apache and word2vec (currently available from Google®). In some embodiments, the word vectors, or language models, may be used as-is; however, in some embodiments, the word vectors may be manipulated, for example, using dimensionality reduction. As a non-limiting example, principal component analysis (PCA) may be run on word vectors to reduce their dimensionality. As a non-limiting example, Python scikit-learn may be used to reduce their dimensionality.

In this context, PCA refers to a statistical procedure that uses an orthogonal transformation to convert a set of observations of possibly correlated variables into a set of values of linearly uncorrelated variables called principal components (or sometimes, principal modes of variation). The number of principal components is less than or equal to the smaller of the number of original variables or the number of observations. This transformation may be defined in such a way that the first principal component has the largest possible variance (e.g., accounts for as much of the variability in the data as possible), and each succeeding component in turn has the highest variance possible under the constraint that it is orthogonal to the preceding components. The resulting vectors are an uncorrelated orthogonal basis set. PCA is sensitive to the relative scaling of the original variables.

In some implementations, users may train their own word vectors, or language models. In some embodiments, the pre-trained word vectors, or language models, may be persistently stored in pre-trained language model storage, for retrieval by example techniques discussed herein.

For a particular term of interest, given a set of other terms and their word vectors, those word vectors that are most similar to the particular term may be retrieved. For example, the most similar word vectors may be retrieved based on computing the distance between the particular term and all other vectors, and taking those with the smallest distance from the particular term. For example, conventional distance measures may be used in computing the distances (e.g., cosine, Euclidean, etc.). In some embodiments, a predetermined threshold number of neighbors (e.g., 20) of the particular term may be retrieved. In this context, the particular term's "neighbors" refers to the words associated with these least-distant word vectors, or language models.

In some embodiments, an analysis may determine a count of how many times a particular term appears as a substring in domain names owned by the brand. For example, another analysis may determine a count of how many times a particular term appears as a substring in all domain names that contain the brand name as a substring.

For the particular term, a language model (e.g., a word vector) may be obtained. In some embodiments, an analysis may determine neighbors of the obtained language model. The neighbors may then be analyzed to determine a percentage of the neighbors that belong to the brand, and a percentage of the neighbors that are not interesting to the brand.

For each particular term, a language model (e.g., a word vector) may be determined with fields storing values indicating the percentages discussed above. The set of language models thus determined may be persistently stored, for example, with pre-processed domain data 218.

FIG. 4 illustrates an example JavaScript Object Notation (JSON) file 400 containing word-value pairs that have been pre-processed. As shown in the example of FIG. 4, a first key-value pair 402 indicates that a URL (Uniform Resource Locator) has a value "1HRBC.INFO", and a second key-value pair 404 indicates that a seed has a value of "hsbc.info". A third key-value pair 405 indicates that the seed string is not present as a substring of the URL. A fourth key-value pair 406 indicates that a matched root has a value of "hrbc" (indicating a match of an interesting substring).

A fifth key-value pair 408 indicates that a match offset has a value of 1 (indicating a starting location in the URL of the interesting substring). A sixth key-value pair 410 indicates that a match length has a value of 4 (indicating a length, from the starting location in the URL, of the interesting substring).

As shown in FIG. 4, a second set of key-value pairs includes a seventh key-value pair 412 indicating that a URL has a value "24HLOCKSMITHSBCN.INFO", and an eighth key-value pair 414 indicates that a seed has a value of "hsbc.info". A ninth key-value pair 415 indicates that the seed string is present as a substring of the URL. A tenth key-value pair 416 indicates that a matched root has a value of "hsbc" (indicating a match of an interesting substring).

An eleventh key-value pair 418 indicates that a match offset has a value of 11 (indicating a starting location in the URL of the interesting substring). A twelfth key-value pair 420 indicates that a match length has a value of 4 (indicating a length, from the starting location in the URL, of the interesting substring).

Other information shown in the key-value pairs, as non-limiting examples, include values of Levenshtein distances. For example, the Levenshtein distance, also known as edit distance (EDIT), is defined as the minimum number of elementary edit operations needed to transform one string into another. Another approach for finding distances may rely on finding the length of the longest common subsequence (LCS) of two strings. Other distance measures may be based on the number of shared n-grams, i.e., substrings of length n. In the fields of computational linguistics and probability, an n-gram is a contiguous sequence of n items from a given sequence of text or speech. For example, an n-gram of size 2 is referred to as a bigram. Skilled artisans appreciate that the similarity or closeness between two text strings from a finite alphabet can be algorithmically quantified using a ratio of bigram similarity and distance. This measure may have a configurable tolerance that depends on the length of the strings under comparison. For example, shorter strings would have a higher requirement for closeness; whereas, longer strings may have a higher tolerance for closeness. Other closeness measures may also be possible.

In some embodiments, an analysis may be performed by social engineering analyzer 204 on all words that are not a match, and on language models (e.g., word vectors) that have been generated for those words that are not a match.

A score may then be computed. For example, the score may indicate how relevant the particular word is to the domain and to the brand, as part of the social engineering determination.

In some embodiments, a set of key-value pairs may be input to the social engineering analyzer 204, as discussed above. For example, a JSON file containing key-value pairs may be input (e.g., as shown in FIG. 4). JSON is a lightweight data-interchange format that is based on a subset of the JavaScript Programming Language. For example, the key-value pairs may provide information regarding domains that match or almost match.

As a non-limiting example, social engineering analyzer 204 may use word vectors to determine relevance of the domains to the seed.

For example, social engineering analyzer 204 may recognize a false positive. If it is determined that the false positive is more relevant, it may be kept.

In some embodiments, social engineering analyzer 204 may look for false positives (FPS), true positives (TPS), and verticals, determining those as not relevant.

Figure 5:
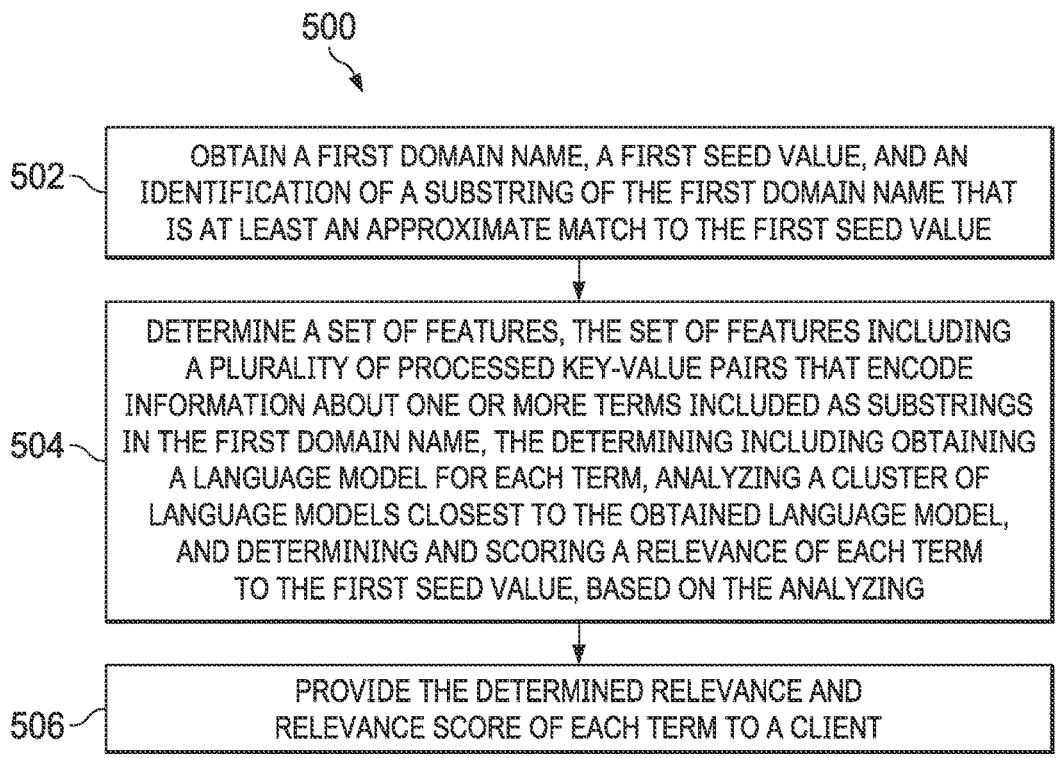
FIG. 5 is a flow chart illustrating an example process performed by a domain engineering analyzer, according to some embodiments.

FIG. 5 is a flow chart illustrating an example process 500 performed by a domain engineering analyzer, according to some embodiments. In this example, process 500 may begin with obtaining a first domain name, a first seed value, and an identification of a substring of the first domain name that is at least an approximate match to the first seed value (e.g., from pre-processing engine 206 as shown in FIG. 2) (502).

Process 500 may determine a set of features (504). The set of features may include processed key-value pairs that encode information about one or more terms included as substrings in the first domain name. The determination may include obtaining a language model for each term, analyzing a cluster of language models closest to the obtained language model, and determining and scoring a relevance of each term to the first seed value, based on the analyzing.

Process 500 may provide the determined relevance and relevance score of the each term, to a client (506).

As a non-limiting example, the substring of the first domain name that is at least an approximate match to the first seed value includes a substring that was previously determined as one or more of an exact match to the first seed value, or an approximate match determined as matching the first seed value within a predetermined threshold measure of distance from the first seed value.

As a non-limiting example, the first seed value may include a brand name.

In some embodiments, a pre-processed set of key-value pairs may be obtained, that includes the first domain name as a value of a first pre-processed key-value pair, and the first seed value as a value of a second pre-processed key-value pair of the pre-processed set of key-value pairs (e.g., as shown in FIG. 4).

In some embodiments, obtaining the substring of the first domain name that is at least an approximate match to the first seed value may include obtaining a pre-processed set of key-value pairs that includes the substring of the first domain name that is at least an approximate match to the first seed as a value of a first pre-processed key-value pair of the pre-processed set of key-value pairs.

In some embodiments, obtaining the substring of the first domain name that is at least an approximate match to the first seed value may include obtaining the pre-processed set of key-value pairs, such that the pre-processed set of key-value pairs includes one or more index values indicating a location of the substring of the first domain name that is at least an approximate match to the first seed value as a value of a first pre-processed key-value pair of the pre-processed set of key-value pairs, as the substring of the first domain name.

In some embodiments, obtaining the substring of the first domain name that is at least an approximate match to the first seed value may include obtaining the pre-processed set of key-value pairs, such that the pre-processed set of key-value pairs includes one or more index values indicating a starting location and an ending location of the substring of the first domain name that is at least an approximate match to the first seed as a value of a first pre-processed key-value pair of the pre-processed set of key-value pairs, as the substring of the first domain name.

In some embodiments, the language model for each term may include a word vector for each term. In some embodiments, analyzing the cluster of language models closest to the obtained language model may include analyzing a plurality of word vectors closest to the obtained word vector.

In some embodiments, analyzing the cluster of language models closest to the obtained language model may include analyzing a plurality of language models within a predetermined threshold distance from the obtained language model.

Figure 6:
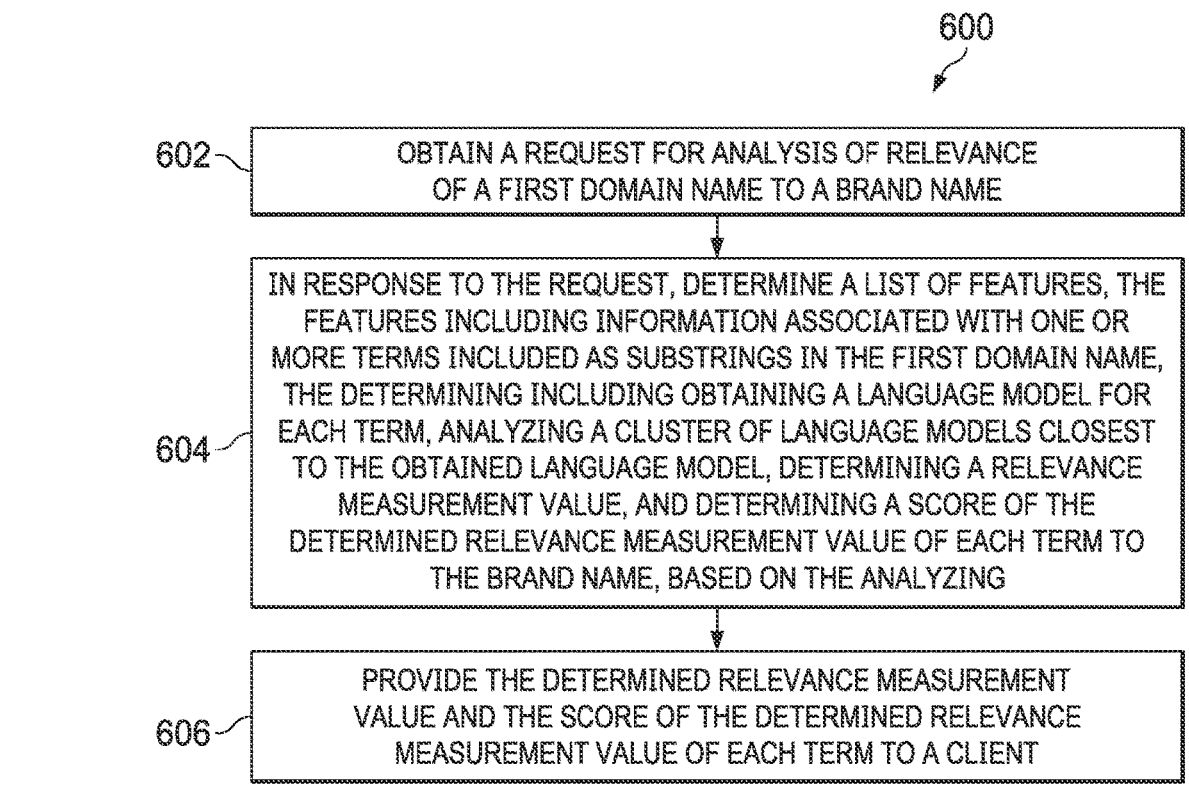
FIG. 6 is a flow chart illustrating an example process performed by a domain engineering analyzer, according to some embodiments.

FIG. 6 is a flow chart illustrating an example process 600 performed by a domain engineering analyzer, according to some embodiments. In this example, process 500 may begin with obtaining a request for analysis of relevance of a first domain name to a brand name (e.g., from pre-processing engine 206 as shown in FIG. 2) (602).

In response to the request, process 600 may determine a list of features. The features may include information associated with one or more terms included as substrings in the first domain name, the determining including obtaining a language model for each respective term, analyzing a cluster of language models closest to the obtained language model, determining a relevance measurement value, and determining a score of the determined relevance measurement value of each respective term to the brand name, based on the analyzing (604).

Process 600 may provide the determined relevance measurement value and the score of the determined relevance measurement value of respective each term, to a client (606).

In some embodiments, obtaining the request for analysis of relevance includes obtaining an identification of a substring of the first domain name that is at least an approximate match to the brand name.

In some implementations, processing of the domain engineering analyzer may be performed in real time.

In some implementations, in pre-processing, all word vectors may be compared.

In some implementations, after determining all domain names that are owned by the brand, or that contain the brand name as a substring, word vectors may be obtained for every word.

In some implementations, every 24 hours, the entire pipeline may be initiated again, for example, obtaining the domain names of whole Internet and passing them through the pre-processing engine.

As discussed herein, for a questionable domain, the single domain may be passed through the social engineering analysis using intelligence gained from pre-processing of the pre-processing engine. In some embodiments, for the single domain, a determination is made of what words are included as substrings in the single domain. For the words, the social engineering analysis may obtain language models (e.g., word vectors). In some implementations, the domain engineering analyzer may then pass on this information and a score. For example, the score may be determined based on multiple data fields. The score may then be added and normalized to statistical vectors, for example, in a range of +1 to −1, indicating a measure of how relevant the questionable domain may be to the seed.

The computed score and intelligence learned may then be passed on to a next module for further processing, which may include adding additional information regarding the questionable domain, which may be classified (e.g., by a classifier).

For example, a determination may be made of what type of website is associated with the questionable domain. Further, a determination may be made of whether the website may be legitimate, whether the website may involve a trademark violation, whether the website is associated with phishing, or whether the website may include a negative page.

For example, in some implementations, at the end of the pipeline, the processed results may be provided to a GUI (graphical user interface). For example, the GUI may provide a display of a list of domain names with classifications of the domain names, and other information related to the domain names.

For example, a technical benefit of this domain engineering analysis is providing a determination of whether an input domain name is relevant to a brand, or not.

Further, other terms that are determined may help with later classification.

Conventionally, word vectors have been used to determine similarity of terms (e.g., words). For example, word vectors have been used conventionally to determine words that co-occur with each other (e.g., by determining that word vectors of the words are close to each other).

In contrast, example techniques discussed herein may utilize word vectors to determine a relevance of a domain name to a brand, even if some words may not be similar (e.g., "apple" and "computer"), but are relevant to the brand (e.g., Apple®). For example, the co-occurrences may be used to determine that the words may be related to the brand. Such word vectors may be any number of dimensions (e.g., 50 dimensions (e.g., Stanford) or 300 dimensions, etc.).

As a non-limiting example, word vectors available from Google, SpacY, etc. may be used to implement language models to determine relevance of the input domain name to the seed value. Alternatively, users may train their own language models (e.g., word vectors).

In some embodiments, an example domain engineering analyzer may perform:

1. Use social engineering analysis to analyze everything in a JSON file's main stream that is not a match. Count dashes, numbers, duplicate letters—and determine where they occur in the domain name. For example, the social engineering analysis may analyze all parts not in matched strings (e.g., takes URL, indices, analyzes all substrings not "HRBC" in the first example in the JSON file of FIG. 4).
2. Tokenize the words. For example, "locksmith", "lock", "smith" (e.g., as in the second example in the JSON file of FIG. 4). Obtain a pre-computed relevance score—relevance to HSBC (The Hongkong and Shanghai Banking Corporation). Obtain a score for each term, and a score for the seed, and combine the scores.

In some embodiments, the complete score is appended to previous results and passed on to a next process or client. In some embodiments, location may be included in the score, as substrings may be more relevant in some locations.

In some embodiments, the components for the score, for each term, may include:

(1) The number of times the term appears in the brand-registered-domains list.
(2) The number of times the term appears in the exact-match list.
(3) The number of neighbors, from the set of all terms under consideration that appear in brand-registered domains.
(4) The number of neighbors, from the set of all terms for which word vectors have been retrieved, that match any of the lexicons defined above.

In some embodiments, a relevance score, between −1 and 1, may be computed from these features. For example, a score closer to 1 may indicate higher relevance of a term (i.e., more relevant), scores around 0 may indicate neutrality, and a score close to −1 may indicate that the term is associated to the brand name but not at all related to it.

In some embodiments, an example social engineering analysis may be summarized as follows:

Given an input domain and, optionally, the start and end indices of the seed match in the domain, the following features may be computed:

(1) Character counts (dashes, numbers, duplicate letters) and their locations in the input domain.
(2) For each term contained in the domain, its relevance score as computed earlier may be retrieved. For example, each term may be determined using segmentation (e.g., via an Apache2-licensed word segment Python module), or each term may be determined by taking all ngrams or every possible substring of the domain.
(3) A final score, taking into account the scores of all the terms, and the location of those terms in the domain.

In some embodiments, if a segment $X_i$ appears in brand-owned domains, a score may be determined as:

$$\text{score}(X_i) = (X_{ib} + AX_{in} + BX_{ig}) / (\max_j (X_{jb} + AX_{jn} + BX_{jg})),$$

where:

$X_{ib}$=Number of occurrences of $X_i$ in brand-owned domains $X_{in}$=Number of brand neighbors of $X_i$ $X_{ig}$=Number of occurrences of $X_i$ in domains that contain the seed as a substring A, B=constants <1

If a segment $X_i$ does not appear in brand-owned domains, the score may be determined as:

$$\text{score}(X_i) = -1 * (X_{ig} / (\max_{[j:\, X_j \text{ not in brand-owned domains}]} X_{jg}))$$

Briefly summarizing, in an example technique, expected inputs may include:

(1) A domain containing a substring that is similar to the brand
(2) The brand itself
(3) Start and end indices of the substring inside the domain For example, for a domain such as "janesapplepie.com", the substring "apple" may be indicated as having a start index of 6 and an end index of 10, or an offset value of 5 with a substring length of 5.

For the example technique discussed above, an example of expected output may include a dictionary (e.g., a lexicon) with the following entries, with many of the entries mapping to a Python list:

'GENERAL': Terms in the domain that match the general social engineering list, e.g., android, express, subscription, . . . , including misspellings.

'PHISHING'; Terms in the domain that match the phishing social engineering list, e.g. identity, authenticate, official, login, . . . , including misspellings.

'GEO': Terms in the domain that match a country name, city, or language.

'URL_STRUCT': Terms in the domain that are often seen in other parts of a URL.

'NEGATIVE': Terms in the domain that are negative, such as "boycott" or "sucks".

'VERTICAL': Terms in the domain that match a particular vertical to which the brand belongs. For example, a vertical may include terms such as "financial" and/or "retail".

'TPS': Terms in the domain that are related specifically to the brand, such as "icloud" and "sierra" for Apple®.

'FPS': Terms in the domain that are related specifically to other meanings of the brand, such as "tree" or "juice" for Apple®.

For the example technique, the same, or similar, lists may operate on the TLD:

'GENERAL_TLD': Terms in the TLD that match the general social engineering list, e.g. android, express, subscription, . . . , including misspellings.

'PHISHING_TLD': Terms in the TLD that match the phishing social engineering list, e.g. identity, authenticate, official, login, . . . , including misspellings.

'GEO_TLD': Terms in the TLD that match a country name, city, or language.

'URL_STRUCT_TLD': Terms in the TLD that are often seen in other parts of a URL.

'NEGATIVE_TLD': Terms in the TLD that are negative, such as "boycott" or "sucks".

'VERTICAL_TLD': Terms in the TLD that match a particular vertical to which the brand belongs. For example, a vertical may include terms such as "financial" and/or "retail".

'TPS_TLD': Terms in the TLD that are related specifically to the brand, such as "icloud" and "sierra" for Apple®.

'FPS_TLD': Terms in the TLD that are related specifically to other meanings of the brand, such as "tree" or "juice" for Apple®.

'DELIMITED': True if the substring similar to the brand is delimited inside the domain (e.g., "my-apple-experience"), False otherwise (e.g., "pineapple")

'NUMBERS_BEFORE': Number of digits directly before the match, or separated by a single delimiter (e.g., "1234apple.com"→4).

'NUMBERS_AFTER': Number of digits directly after the match, or separated by a single delimiter (e.g., "apple546.com"→3).

'AT_START': True if the substring similar to the brand is also the first part of the URL (e.g., "hsbcblah" vs. "aoisjfhsbckl").

'COUNT_DASHES': Number of dashes ("-") in the domain.

Figure 7:
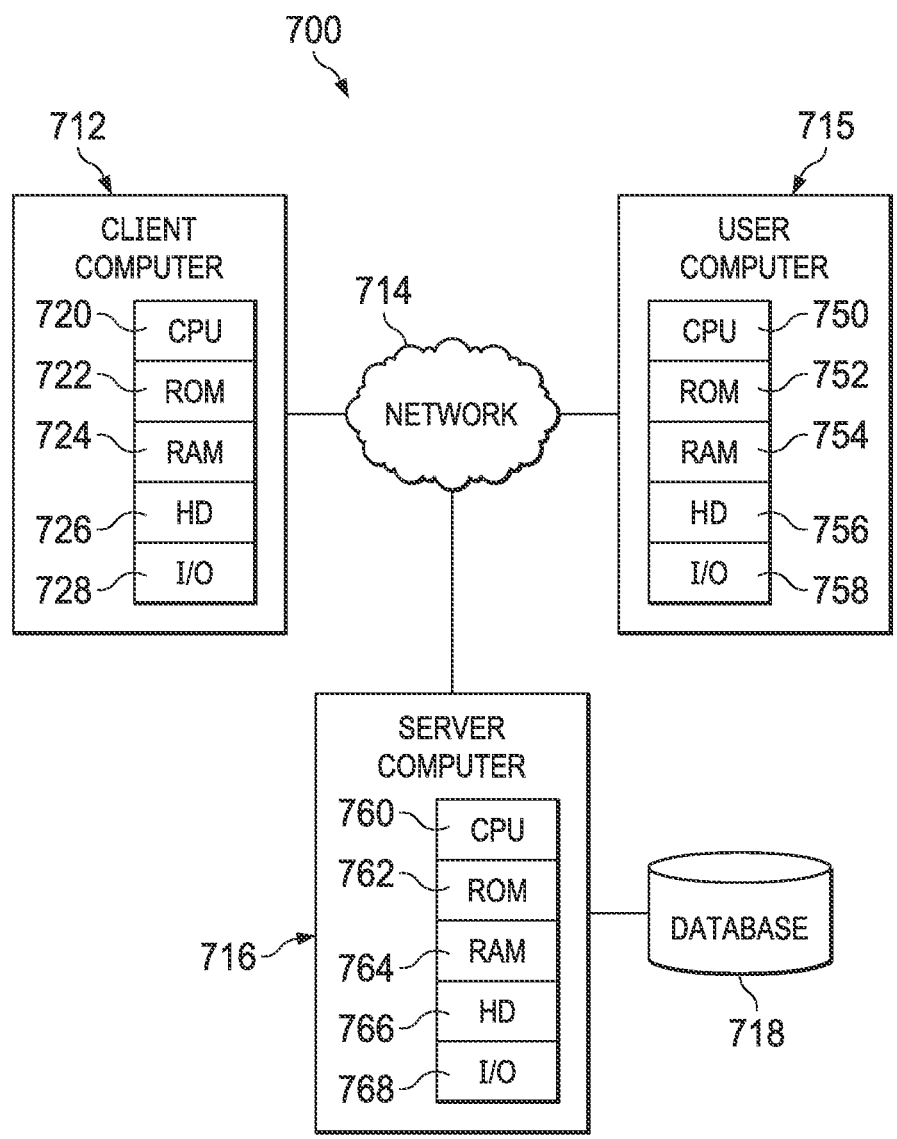
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. In the example illustrated, network computing environment 700 includes network 714 that can be bi-directionally coupled to computer 712, computer 715, and computer 716. Computer 716 can be bi-directionally coupled to data store 718. Network 714 may represent a combination of wired and wireless networks that network computing environment 700 may utilize for various types of network communications known to those skilled in the art.

For the purpose of illustration, a single system is shown for each of computer 712, computer 715, and computer 716. However, with each of computer 712, computer 715, and computer 716, a plurality of computers (not shown) may be interconnected to each other over network 714. For example, a plurality of computers 712 and a plurality of computers 715 may be coupled to network 714. Computers 712 may include data processing systems for communicating with computer 716. Computers 715 may include data processing systems for individuals whose jobs may require them to configure services used by computers 712 in network computing environment 700.

First enterprise computer 712 can include central processing unit ("CPU") 720, read-only memory ("ROM") 722, random access memory ("RAM") 724, hard drive ("HD") or storage memory 726, and input/output device(s) ("I/O") 728. I/O 729 can include a keyboard, monitor, printer, electronic pointing device (e.g., mouse, trackball, stylus, etc.), or the like. Computer 712 can include a desktop computer, a laptop computer, a personal digital assistant, a cellular phone, or nearly any device capable of communicating over a network.

Computer 715 may be similar to computer 712 and can comprise CPU 750, ROM 752, RAM 754, HD 756, and I/O 758.

Likewise, computer 716 may include CPU 760, ROM 762, RAM 764, HD 766, and I/O 768. Computer 716 may include one or more backend systems configured for providing a variety of services to computers 712 over network 714. These services may utilize data stored in data store 718. Many other alternative configurations are possible and known to skilled artisans.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 712, 715, and 716 is an example of a data processing system. ROM 722, 752, and 762; RAM 724, 754, and 764; HD 726, 756, and 766; and data store 718 can include media that can be read by CPU 720, 750, or 760. Therefore, these types of memories include non-transitory computer-readable storage media. These memories may be internal or external to computers 712, 715, or 716.

Portions of the methods described herein may be implemented in suitable software code that may reside within ROM 722, 752, or 762; RAM 724, 754, or 764; or HD 726, 756, or 766. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A method, comprising:
   obtaining, by a computer, a domain name, a seed value, and an identification of a substring of the domain name that is relevant match to the seed value;
   determining, by the computer, key-value pairs that encode information about terms in substrings of the domain name, the terms including a term in the substring of the domain name, wherein the determining comprises:
      obtaining a language model for the term in the substring of the domain name;
      analyzing a cluster of language models closest to the language model for the term in the substring of the domain name, wherein the analyzing the cluster of language models comprises analyzing a plurality of language models within a predetermined threshold distance from the language model for the term in the substring of the domain name; and
      determining, based on the analyzing, a relevance of the term in the substring of the domain name to the seed value; and
   providing, by the computer, the relevance of the term in the substring of the domain name to the seed value to a computing device.

2. The method according to claim 1, wherein each of the plurality of language models is associated with a word that does not match the term in the substring of the domain name.

3. The method according to claim 1, wherein the information about the terms in the substrings of the domain name comprises values of edit distances.

4. The method according to claim 1, wherein the language model for the term in the substring of the domain name comprises a word vector for the term and wherein the relevance of the term in the substring of the domain name to the seed value is determined utilizing the word vector for the term.

5. The method according to claim 1, wherein the key-value pairs include one or more index values indicating a starting location and an ending location of the substring of the domain name.

6. The method according to claim 1, wherein the seed value comprises a brand name.

7. The method according to claim 6, wherein determining the relevance of the term in the substring of the domain name to the seed value comprises generating a score that indicates how relevant the term in the substring of the domain name is to the domain name and to the brand name.

8. A system, comprising:
   a processor;
   a non-transitory computer-readable medium; and
   instructions stored on the non-transitory computer-readable medium and translatable by the processor for:
      obtaining a domain name, a seed value, and an identification of a substring of the domain name that is relevant match to the seed value;
      determining key-value pairs that encode information about terms in substrings of the domain name, the terms including a term in the substring of the domain name, wherein the determining comprises:
         obtaining a language model for the term in the substring of the domain name;
         analyzing a cluster of language models closest to the language model for the term in the substring of the domain name, wherein the analyzing the cluster of language models comprises analyzing a plurality of language models within a predetermined threshold distance from the language model for the term in the substring of the domain name; and
         determining, based on the analyzing, a relevance of the term in the substring of the domain name to the seed value; and
      providing the relevance of the term in the substring of the domain name to the seed value to a computing device.

9. The system of claim 8, wherein each of the plurality of language models is associated with a word that does not match the term in the substring of the domain name.

10. The system of claim 8, wherein the information about the terms in the substrings of the domain name comprises values of edit distances.

11. The system of claim 8, wherein the language model for the term in the substring of the domain name comprises a word vector for the term and wherein the relevance of the term in the substring of the domain name to the seed value is determined utilizing the word vector for the term.

12. The system of claim 8, wherein the key-value pairs include one or more index values indicating a starting location and an ending location of the substring of the domain name.

13. The system of claim 8, wherein the seed value comprises a brand name.

14. The system of claim 13, wherein determining the relevance of the term in the substring of the domain name to the seed value comprises generating a score that indicates how relevant the term in the substring of the domain name is to the domain name and to the brand name.

15. A computer program product comprising a non-transitory computer-readable medium storing instructions translatable by a processor for:
   obtaining a domain name, a seed value, and an identification of a substring of the domain name that is relevant match to the seed value;
   determining key-value pairs that encode information about terms in substrings of the domain name, the terms including a term in the substring of the domain name, wherein the determining comprises:
      obtaining a language model for the term in the substring of the domain name;
      analyzing a cluster of language models closest to the language model for the term in the substring of the domain name, wherein the analyzing the cluster of language models comprises analyzing a plurality of language models within a predetermined threshold distance from the language model for the term in the substring of the domain name; and determining, based on the analyzing, a relevance of the term in the substring of the domain name to the seed value; and providing the relevance of the term in the substring of the domain name to the seed value to a computing device.

16. The computer program product of claim 15, wherein each of the plurality of language models is associated with a word that does not match the term in the substring of the domain name.

17. The computer program product of claim 15, wherein the information about the terms in the substrings of the domain name comprises values of edit distances.

18. The computer program product of claim 15, wherein the language model for the term in the substring of the domain name comprises a word vector for the term and wherein the relevance of the term in the substring of the domain name to the seed value is determined utilizing the word vector for the term.

19. The computer program product of claim 15, wherein the key-value pairs include one or more index values indicating a starting location and an ending location of the substring of the domain name.

20. The computer program product of claim 15, wherein the seed value comprises a brand name and wherein determining the relevance of the term in the substring of the domain name to the seed value comprises generating a score that indicates how relevant the term in the substring of the domain name is to the domain name and to the brand name.

* * * * *